United States Patent
Zhang et al.

(10) Patent No.: US 12,548,618 B2
(45) Date of Patent: Feb. 10, 2026

(54) SEMICONDUCTOR STRUCTURE AND MANUFACTURING METHOD THEREFOR, AND MEMORY

(71) Applicant: CHANGXIN MEMORY TECHNOLOGIES, INC., Hefei (CN)

(72) Inventors: Shuhao Zhang, Hefei (CN); Ning Li, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 366 days.

(21) Appl. No.: 18/451,077

(22) Filed: Aug. 16, 2023

(65) Prior Publication Data

US 2024/0096410 A1 Mar. 21, 2024

Related U.S. Application Data

(63) Continuation of application No. PCT/CN2022/124054, filed on Oct. 9, 2022.

(30) Foreign Application Priority Data

Sep. 19, 2022 (CN) .......................... 202211139824.8

(51) Int. Cl.
*G11C 11/4097* (2006.01)
*H10B 12/00* (2023.01)

(52) U.S. Cl.
CPC .......... *G11C 11/4097* (2013.01); *H10B 12/02* (2023.02); *H10B 12/482* (2023.02); *H10B 12/485* (2023.02)

(58) Field of Classification Search
CPC ... G11C 11/4097; G11C 11/401; G11C 5/025; H10B 12/02; H10B 12/482; H10B 12/485; H10B 12/50
See application file for complete search history.

(56) References Cited

U.S. PATENT DOCUMENTS

2011/0235407 A1* 9/2011 Lim ...................... H10B 10/12
257/E23.141

* cited by examiner

*Primary Examiner* — Mohammed R Alam
(74) *Attorney, Agent, or Firm* — Syncoda LLC; Feng Ma

(57) ABSTRACT

A semiconductor structure includes: multiple active areas arranged in an array along intersecting first and second directions and spaced apart by an isolation structure; a bit line select structure comprising a first gate, a second gate, a third gate and a fourth gate located on four mutually adjacent active areas, and at least one connecting line located on the isolation structure; and multiple contact structures, each of the multiple contact structures being located on one side, close to the connecting line, of both sides of a respective gate and connected with a respective one of the multiple active areas, and an orthographic projection of the contact structure on a plane where the active area is located being at a position, close to the connecting line, in the active area.

20 Claims, 11 Drawing Sheets

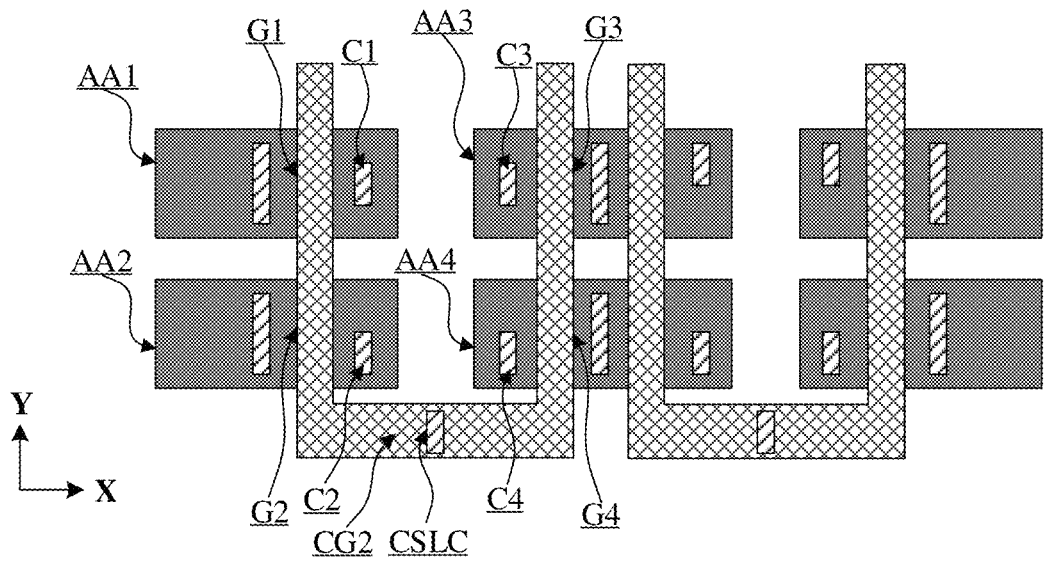

FIG. 6D

| multiple active areas are formed, the multiple active areas being arranged in an array along intersecting first and second directions and being spaced apart by an isolation structure, the first direction being parallel to a direction in which the active areas extend | S701 |
|---|---|
| a bit line select structure is formed, the bit line select structure comprising: a first gate, a second gate, a third gate and a fourth gate all extending along the second direction and located on four mutually adjacent active areas in the multiple active areas respectively, and at least one connecting line extending along the first direction and located on the isolation structure; an end of the first gate being connected with an end of the second gate, an end of the third gate being connected with an end of the fourth gate, and the connecting line connecting two corresponding ends of the first gate and the third gate and/or two corresponding ends of the second gate and the fourth gate | S702 |
| multiple contact structures are formed, each of the multiple contact structures being located on one side, close to the connecting line, of both sides of a respective gate and connected with a respective one of the multiple active areas, and an orthographic projection of the contact structure on a plane where the active area is located being at a position, close to the connecting line, in the active area | S703 |

FIG. 7

SEMICONDUCTOR STRUCTURE AND MANUFACTURING METHOD THEREFOR, AND MEMORY

CROSS-REFERENCE TO RELATED APPLICATIONS

This is a continuation of International Patent Application No. PCT/CN2022/124054 filed on Oct. 9, 2022, which claims priority to Chinese Patent Application No. 202211139824.8 filed on Sep. 19, 2022. The disclosures of the above-referenced applications are hereby incorporated by reference in their entirety.

BACKGROUND

Dynamic Random Access Memory (DRAM) includes memory cells (memory bits) arranged in an array. Each memory cell includes a transistor and a capacitor. The transistor acts as a switch between the capacitor and a Bit Line (BL) and may be activated by a Word Line (WL) coupled to a control end of the transistor. The memory cell may store binary information as charges on the capacitor. A bit line select line (Column Select Line, CSL) transistor enters a conduction state through a bit line select line signal of a bit line select line of a bit line select unit, and an external line may read specific information from the BL, or the external line may perform a write operation on a memory cell through the BL, so that data may be written into or read out from the memory cell correctly.

SUMMARY

Embodiments of the present disclosure relate to the technical field of semiconductors, and in particular to a semiconductor structure and a manufacturing method therefor, and a memory.

According to a first aspect of an embodiment of the present disclosure, there is provided a semiconductor structure, which includes: multiple active areas, a bit line select structure and multiple contact structures.

The multiple active areas are arranged in an array along intersecting first and second directions and spaced apart by an isolation structure. The first direction is parallel to a direction in which the active areas extend.

The bit line select structure includes a first gate, a second gate, a third gate and a fourth gate all extending along the second direction and located on four mutually adjacent active areas of the multiple active areas respectively, and at least one connecting line extending along the first direction and located on the isolation structure. An end of the first gate is connected with an end of the second gate, an end of the third gate is connected with an end of the fourth gate, and the connecting line connects two corresponding ends of the first gate and the third gate and/or two corresponding ends of the second gate and the fourth gate.

Each of the multiple contact structures is located on one side, close to the connecting line, of both sides of a respective gate and connected with a respective one of the multiple active areas. An orthographic projection of the contact structure on a plane where the active area is located is at a position, close to the connecting line, in the active area.

According to a second aspect of an embodiment of the present disclosure, there is provided a memory, including the semiconductor structure above.

According to a third aspect of an embodiment of the present disclosure, there is provided a method for manufacturing a semiconductor structure, which includes the following operations.

Multiple active areas are formed. The multiple active areas are arranged in an array along intersecting first and second directions and spaced apart by an isolation structure. The first direction is parallel to a direction in which the multiple active areas extend.

A bit line select structure is formed. The bit line select structure includes: a first gate, a second gate, a third gate and a fourth gate all extending along the second direction and located on four mutually adjacent active areas of the multiple active areas respectively, and at least one connecting line extending along the first direction and located on the isolation structure. An end of the first gate is connected with an end of the second gate, an end of the third gate is connected with an end of the fourth gate, and the connecting line connects two corresponding ends of the first gate and the third gate and/or two corresponding ends of the second gate and the fourth gate.

Multiple contact structures are formed. Each of the multiple contact structures is located on one side, close to the connecting line, of both sides of a respective gate and connected with a respective one of the multiple active areas, and an orthographic projection of the contact structure on a plane where the active area is located is at a position, close to the connecting line, in the active area.

BRIEF DESCRIPTION OF THE DRAWINGS

FIG. 6D is a fourth schematic layout of further semiconductor structures provided by embodiments of the present disclosure.

FIG. 7 is a flowchart of a method for manufacturing a semiconductor structure provided by an embodiment of the present disclosure.

DETAILED DESCRIPTION

Figure 1:
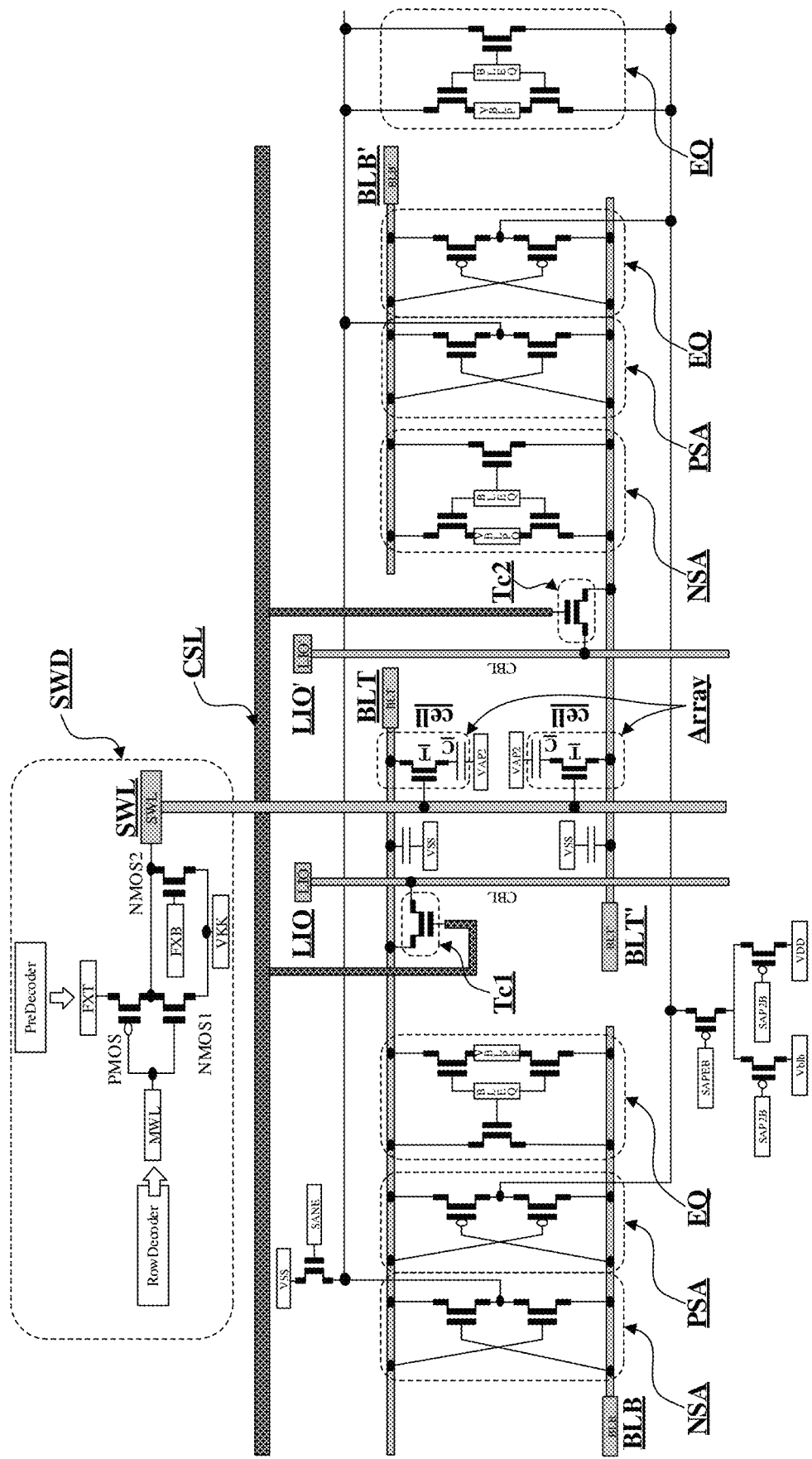
FIG. 1 is a circuit schematic diagram of a core device of a memory provided by an embodiment of the present disclosure.

Exemplary implementations of the present disclosure will be described in more detail below with reference to the accompanying drawings. While exemplary implementations of the present disclosure are shown in the accompanying drawings, it should be understood that the present disclosure may be implemented in various forms and should not be limited by the specific implementations set forth herein. In contrast, these implementations are provided to enable a more thorough understanding of the present disclosure and to fully convey the scope of the present disclosure to those skilled in the art.

In the following description, numerous specific details are given to provide a more thorough understanding of the present disclosure. However, it will be apparent to those skilled in the art that the present disclosure may be implemented without one or more of these details. In other examples, some technical features that are well known in the art are not described to avoid confusion with the present disclosure. That is, not all features of the actual embodiments are described herein and well-known functions and structures are not described in detail.

In the accompanying drawings, sizes of layers, areas, and elements, and their relative sizes may be exaggerated for clarity. The same reference numerals denote the same elements throughout the specification.

It should be understood that spatial relation terms such as "under", "below", "lower", "above", "on", "upper" etc. may be used herein to describe a relationship between one element or feature and other elements or features shown in the figures for convenience of description. It should be understood that the spatial relation terms are intended to include different orientations of devices in use and operation in addition to the orientations shown in the figures. For example, if the device in the figure is flipped, then an element or feature described as "below" or "under" other elements or features will be oriented "above" the other elements or features. Thus, the exemplary terms "below" and "under" may include both upper and lower orientations. The device may be additionally oriented (rotated 90 degrees or other orientation) and the spatial terms used herein will be interpreted accordingly.

The terms used herein are intended to describe specific embodiments only and do not intended to limit the present disclosure. As used herein, a singular form of "a", "an" or "said/the" is also intended to include a plural form, unless the context clearly indicates otherwise. It should also be understood that the terms "comprising" and/or "including", when used in this specification, determine the presence of the features, integers, steps, operations, elements and/or components, but do not exclude the presence or addition of one or more other features, integers, steps, operations, elements, components and/or groups. As used herein, the term "and/or" includes any and all combinations of related listed items.

In order to enable a more detailed understanding of the features and technical content of the embodiments of the present disclosure, the implementation of the embodiments of the present disclosure will be described in detail below in conjunction with the accompanying drawings, which are for illustration only and are not intended to limit the embodiments of the present disclosure.

A memory involved in embodiments of the present disclosure includes but is not limited to a dynamic random access memory which is described below only as an example. It should be noted that the description of the following embodiments with respect to the dynamic random access memory is only used to illustrate the present disclosure, and is not intended to limit the scope of the present disclosure.

FIG. 1 is a circuit schematic diagram of a core device of a memory provided by an embodiment of the present disclosure.

As shown in FIG. 1, the dynamic random access memory includes a large number of memory cell arrays and a large number of logic circuits coupled to the memory cell arrays, and the logic circuits are responsible for controlling an operation of the entire memory chip.

The dynamic random access memory includes a memory cell, a Sub-Word Line (SWL), a bit line BLT/BLB, a complementary bit line BLT '/BLB', a Sub-Word line Drive (SWD), a sense amplifier (SA), an Equalizer (EQ), and a bit line select unit (also referred to as a "bit line select structure"). The sense amplifier SA includes a PMOS of Sense-Amplifier (PSA), a NMOS of Sense-Amplifier (NSA), and the bit line select unit includes a bit line select line CSL and bit line select line transistors Tc1, Tc2. Hereinafter, the bit line select unit may also be referred to as a bit line selector, a column select unit, or a column selector, and the bit line select line CSL may also be referred to as a column select line CSL.

Each memory cell includes a transistor T and a capacitor C, i.e. a 1T1C structure. The capacitor is responsible for storing information and represents logical 1 by more charges stored therein or a high voltage difference between two ends of the capacitor, or represents logical 0 by fewer charges stored therein or a low voltage difference between the two ends of the capacitor. The voltage on the word line (referring to sub word line SWL in FIG. 1) decides the conduction or off of the transistor T, and the conduction or off of the transistor T decides to allow or prohibit reading and rewriting of information stored in the capacitor. The bit line (referring to the bit line BLT and the complementary bit line BLT' in FIG. 1) is an only channel for an external line to access the capacitor C. After the transistor T is conducted, the external line may perform read or write operations on the capacitor C through the bit line. The sub word line drive SWD circuit is mainly responsible for providing a driving voltage for the memory. The sense amplifier SA is connected between the bit line BLT and the complementary bit line BLT' to detect and amplify a voltage difference between a pair of bit line BLT and the complementary bit line BLT'. The equalizer EQ is located between the bit line BLT and the complementary bit line BLT' to equalize a voltage between the bit line BLT and the complementary bit line BLT'. The bit line selection unit is configured to select the bit line BLT and the complementary bit line BLT' for performing read and write operations through the bit line selection line CSL. The bit line selection line transistors Tc1 and Tc2 are enabled to enter a conduction state by a bit line selection line signal, and the external line (referring to the Local Input Output (LIO) line in FIG. 1) may read the information stored in the capacitor from the bit line BLT and the complementary bit line BLT', or the external line may rewrite the information stored in the capacitor through the bit line BLT and the complementary bit line BLT', so that the data may be written into or read from the memory unit correctly. However, there are many challenges in a design of the bit line select unit, and for example, a mismatch between multiple bit line select line transistors in the bit line select unit is an urgent issue to be addressed.

Figure 2:
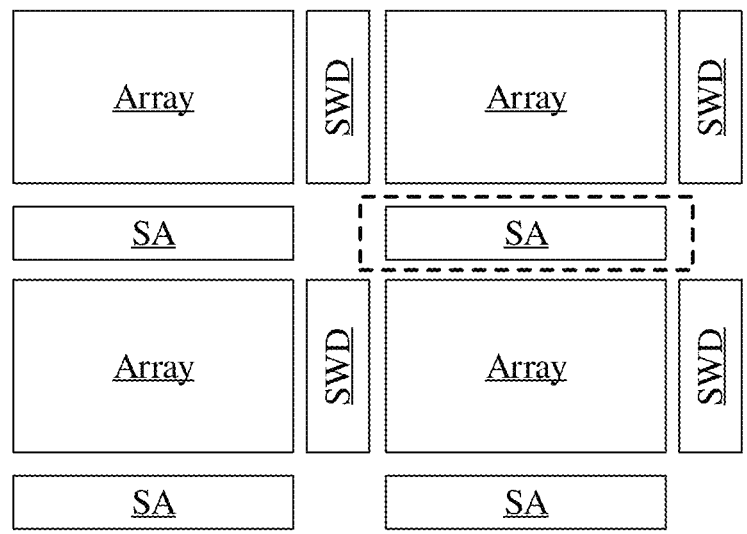
FIG. 2 is a partial schematic diagram of a circuit layout of a core device of a memory provided by an embodiment of the present disclosure.
Figure 3:
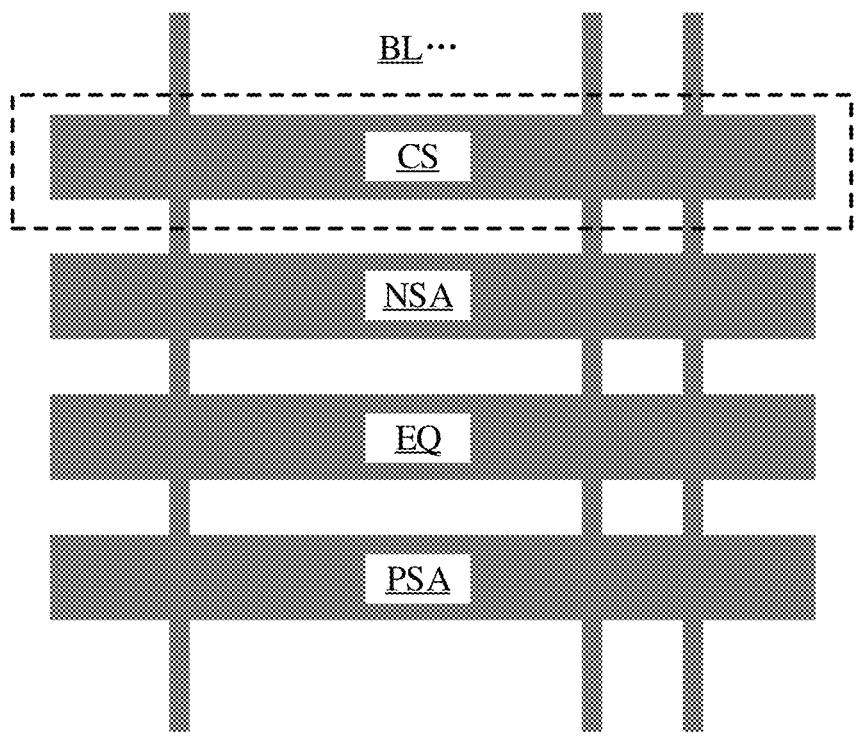
FIG. 3 is a schematic diagram of a circuit and circuit layout design of a sense amplifier area provided by an embodiment of the present disclosure.

FIG. 2 is a partial schematic diagram of a circuit layout of a core device of a memory provided by an embodiment of the present disclosure. FIG. 3 is a schematic diagram of a circuit and circuit layout design of a sense amplifier area provided by an embodiment of the present disclosure. It should be noted that FIG. 3 is an enlarged schematic diagram of the dashed box area in FIG. 2.

As shown in FIG. 2, it can be understood herein with reference to the circuit schematic diagram shown in FIG. 1 that, the memory includes a memory unit array area, a sense amplifier SA area, and a sub word line drive SWD area.

As shown in FIG. 3, it can be understood herein with reference to the circuit schematic diagram shown in FIG. 1 that, the sense amplifier SA area mainly includes multiple circuit modules, such as the equalizer EQ, the PMOS of the sense amplifier PSA, the NMOS of the sense amplifier NSA, and the bit line selector CS.

In order to ensure that the data amplified by the sense amplifier can be read effectively and quickly, the data transmitted to the local input output (referring to the local input output LIO, LIO' in FIG. 1) requires the bit line select line transistor (referring to the bit line select line transistors Tc1, Tc2 in FIG. 1) to have good switching characteristics, for example, have a good switching ratio (Ion/Ioff), etc., and requires to maintain consistency in device performance between the bit line select line transistor Tc1 and the bit line select line transistor Tc2 to avoid mismatch.

Figure 4A:
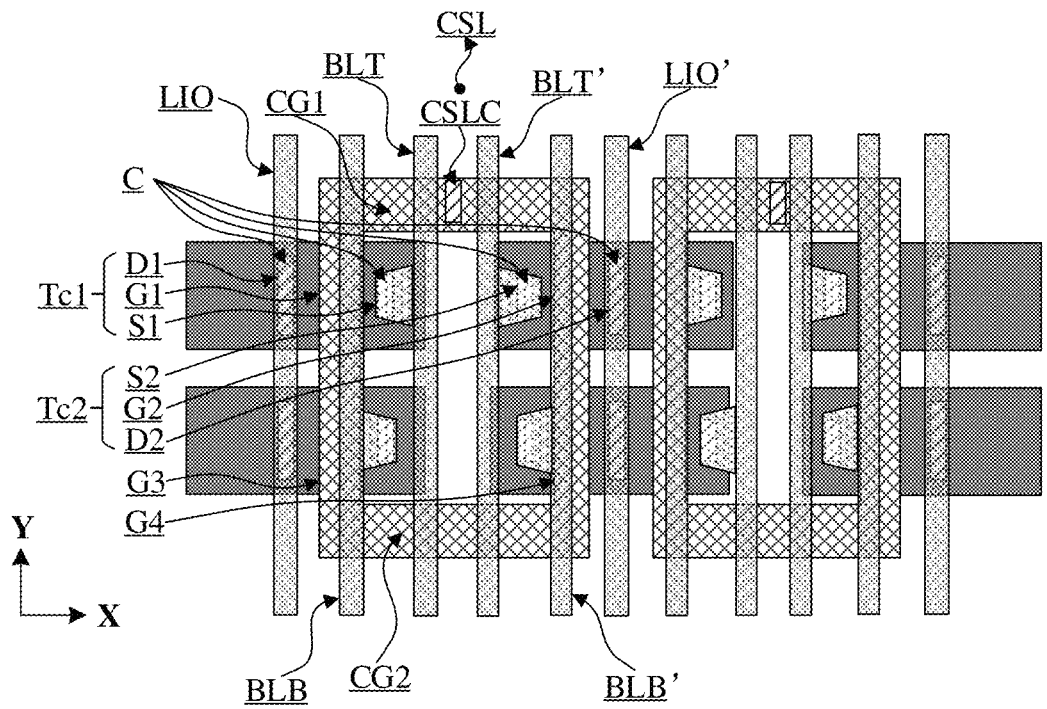
FIG. 4A is a schematic layout of a semiconductor structure provided by an embodiment of the present disclosure.
Figure 4B:
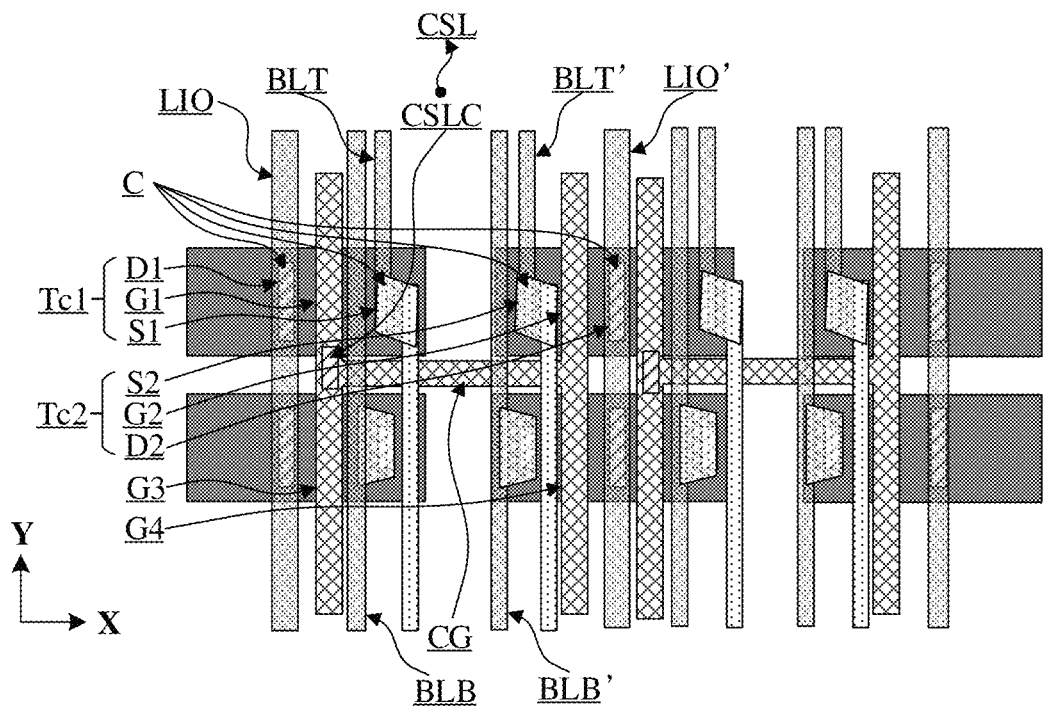
FIG. 4B is a schematic layout of another semiconductor structure provided by an embodiment of the present disclosure.

FIG. 4A is a schematic layout of a semiconductor structure provided by an embodiment of the present disclosure. FIG. 4B is a schematic layout of another semiconductor structure provided by an embodiment of the present disclosure.

Referring to FIGS. 4A and 4B, the semiconductor structure includes: a bit line select line CSL, bit line select line transistors Tc1, Tc2, bit lines and complementary bit lines BLT, BLT', BLB, and BLB', and input/output lines LIO, LIO'. It can be understood herein with reference to the circuit schematic diagram shown in FIG. 1. It should be noted that the bit lines BLT, BLT', BLB, BLB' and the input/output lines LIO, LIO' are shown in perspective herein to show the layout of contact structures C for sources and drains of the bit line select line transistors Tc1, Tc2.

Exemplary, the bit line selection line CSL is connected to the gates G1, G2 of the bit line selection line transistors Tc1, Tc2 through a bit line select line contact CSLC (or referred to as a column select line contact CSLC). The bit lines BLT, BLT' are connected to the source S1, S2 of the bit line select line transistors Tc1, Tc2 through the contact structures C, respectively. The input/output lines LIO, LIO' are connected to the drains D1, D2 of the bit line select line transistors Tc1, Tc2 through the contact structures C, respectively.

In order to ensure that the data amplified by the sense amplifier SA can be read and transmitted to the input/output lines LIO, LIO' effectively and quickly, the bit line select line transistors Tc1, Tc2 are required to have good switching characteristics, and in order to avoid a difference in data read by each data unit, multiple bit line select line transistors Tc1, Tc2 in the same group are required to be consistent.

FIGS. 4A and 4B show two kinds of layout design of the semiconductor structure. A first gate G1, a second gate G2, a third gate G3, a fourth gate G4, and a connecting line CG (or connecting lines CG1, CG2) are arranged in an "H" shape (or rectangular), and the layout is well-proportioned and symmetrical, which facilitates manufacturing and a consistency of electrical properties.

In a practical application, in order to maintain the maximum data output density, the semiconductor structure includes a transistor construction with 4 or 8 transistors in a group. Exemplary, the semiconductor structure is illustrated as a group consisting of 4 transistors herein and below.

Figure 5A:
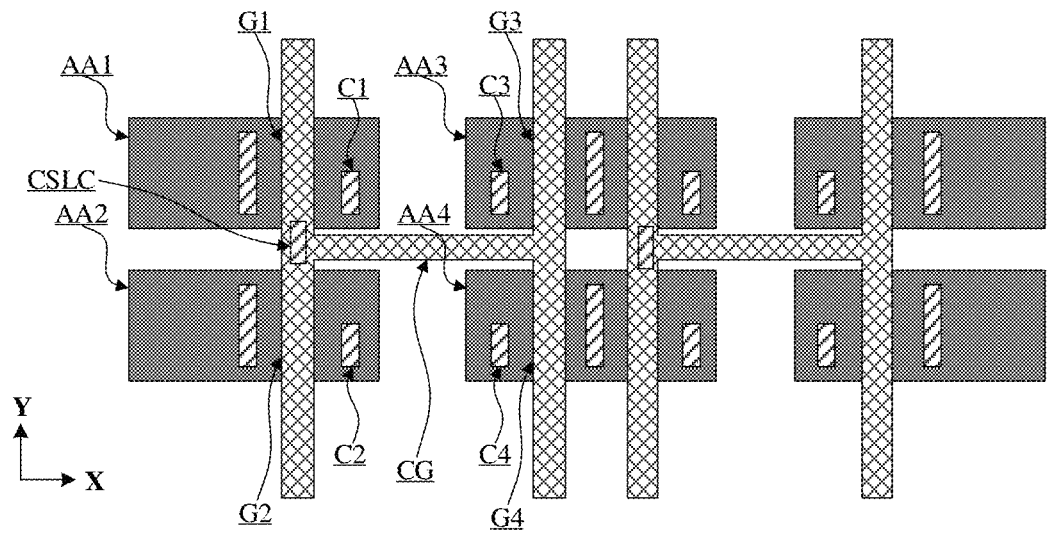
FIG. 5A is a schematic layout of still another semiconductor structure provided by an embodiment of the present disclosure.

FIG. 5A is a schematic layout of still another semiconductor structure provided by an embodiment of the present disclosure. It should be noted that, in order to highlight the layout of the contact structures C1-C4 on the sources and drains of the bit line select line transistors herein, active areas AA1-AA4, the gates G1-G4, the connecting line CG, the bit line select line contact CSLC and the contact structures C1-C4 corresponding to the bit line select line transistors are shown, and other structures such as the bit lines, the input/output lines, and isolation structures between the active areas are not shown.

Figure 5B:
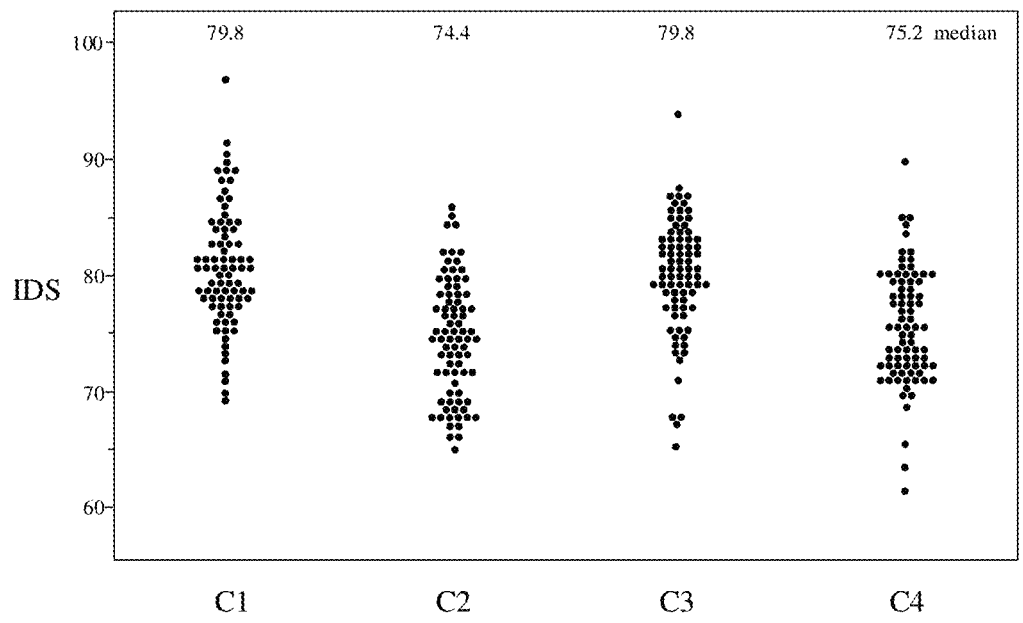
FIG. 5B is a schematic diagram of test results for an on-state current (IDS) of still another semiconductor structure provided by an embodiment of the present disclosure.
Figure 5C:
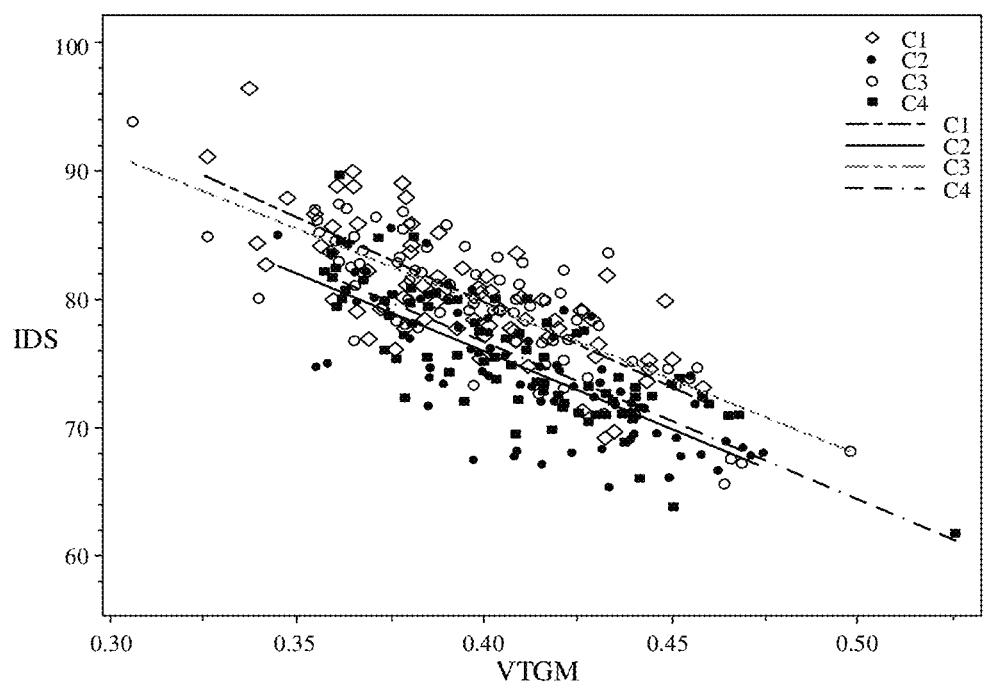
FIG. 5C is a schematic diagram of test results for a threshold voltage-IDS (VTGM-IDS) curve of still another semiconductor structure provided by an embodiment of the present disclosure.

FIG. 5B is a schematic diagram of test results for an on-state current (IDS) of still another semiconductor structure provided by an embodiment of the present disclosure. FIG. 5C is a schematic diagram of test results for a threshold voltage-IDS (VTGM-IDS) curve of still another semiconductor structure provided by an embodiment of the present disclosure.

It should be noted herein that, the test is carried out with the semiconductor structure provided in FIG. 5A, and the bit line select line transistors corresponding to the contact structures C1-C4 are tested and compared.

Referring to FIG. 5A, each active area (e.g. the active area AA1) and the contact structure (e.g. the contact structure C1) on the active area are placed at exactly corresponding positions, similar to the result of continuously copying a unit. However, due to a distance from the connecting line CG, the distances from the contact structures C1 and C3 to the connection line CG are smaller than the distances from the contact structures C2 and C4 to the connection line CG, that is, the contact structures C1 and C3 are closer to the connection line CG relative to the contact structures C2 and C4.

Referring to FIG. 5B, table 1 below, and FIG. 5A, under a normal operating condition, the operating currents IDS (also referred to as "on-state currents") of the bit line select line transistors corresponding to the contact structures C1 and C3 are usually greater than the operating currents IDS of the bit line select line transistors corresponding to the contact structures C2 and C4. It can be observed from FIG. 5B that the electrical properties of the bit line select line transistors corresponding to the contact structures C1 and C3 are much better than those of the bit line select line transistors corresponding to the contact structures C2 and C4, with an increase of approximately 6% in the on-state current IDS.

TABLE 1

|              | C1   | C2   | C3   | C4   |
|--------------|------|------|------|------|
| IDS (median)/μA | 79.8 | 74.4 | 79.8 | 75.2 |

Further, referring to FIG. 5C, under the same threshold voltage VTGM, the on-state currents (expected value) of the bit line select line transistors corresponding to the contact structures C1 and C3 are usually greater than the on-state currents (expected value) of the bit line select line transistors corresponding to the contact structures C2 and C4.

That is to say, the design structure with the contact structure closer to the connecting line can ensure that the bit line select line transistors corresponding to the contact structures have consistent characteristics, and also have better electrical characteristics.

Based on this, in order to solve one or more of the above problems, an embodiment of the present disclosure proposes to move the contact structures to positions close to the connecting line, so as to improve the performances of the bit line select line transistors in the bit line selector and reduce the mismatch.

FIGS. 6A-6D are schematic layouts of further semiconductor structures provided by embodiments of the present disclosure. It should be noted that in FIGS. 6A-6D, in order to highlight the layout of the contact structures C1-C4 on the sources and drains of the bit line select line transistors, the active areas AA1-AA4, the gates G1-G4, the connecting line CG, the bit line select line contact CSLC and the contact structures C1-C4 corresponding to the bit line select line transistors are shown, and other structures such as the bit lines, the input/output lines, and isolation structures between the active areas are not shown.

Figure 6A:
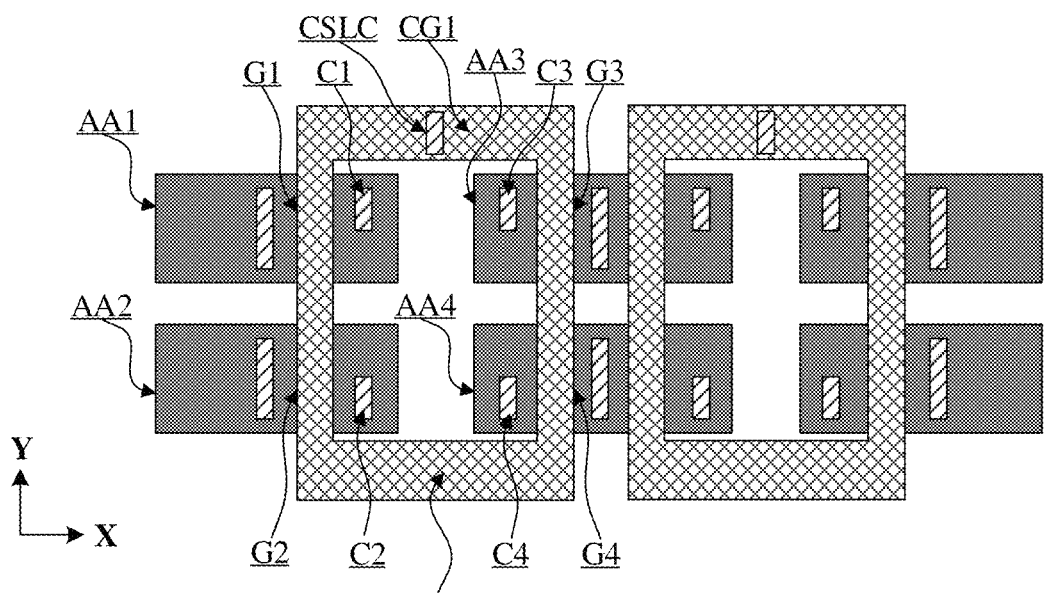
FIG. 6A is a first schematic layout of further semiconductor structures provided by embodiments of the present disclosure.
Figure 6B:
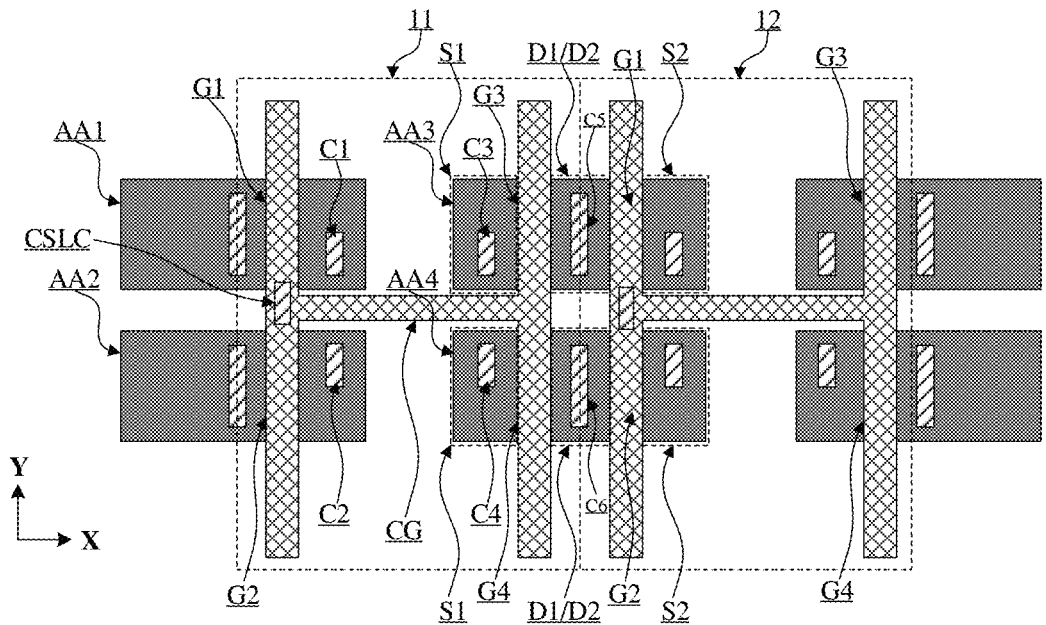
FIG. 6B is a second schematic layout of further semiconductor structures provided by embodiments of the present disclosure.

Referring to FIGS. 6A and 6B, according to a first aspect of an embodiment of the present disclosure, there is provided a semiconductor structure, comprising: multiple active areas, a bit line select structure and multiple contact structures.

The multiple active areas are arranged in an array along intersecting first and second directions and are spaced apart by an isolation structure. The first direction is parallel to a direction in which the active areas extend.

The bit line select structure comprises: a first gate, a second gate, a third gate and a fourth gate all extending along the second direction and located on four mutually adjacent active areas in the multiple active areas respectively, and at least one connecting line extending along the first direction and located on the isolation structure. An end of the first gate is connected with an end of the second gate, an end of the third gate is connected with an end of the fourth gate, and the connecting line connects two corresponding ends of the first gate and the third gate and/or two corresponding ends of the second gate and the fourth gate.

Each of the multiple contact structures is located on one side, close to the connecting line, of both sides of a respective gate and connected with a respective one of the multiple active areas, and an orthographic projection of the contact structure on a plane where the active area is located is at a position, close to the connecting line, in the active area.

The semiconductor structure provided by an embodiment of the present disclosure will be described in detail below in conjunction with FIGS. 6A and 6B.

Herein, the first direction is parallel to the direction in which each active area extends, the second direction is parallel to a plane in which the active area is located, and an included angle between the first direction and the second direction ranges from 0 degree to 90 degrees. In some embodiments, the first direction is perpendicular to the second direction. In some specific embodiments, the first direction may be a direction extending along the X axis and the second direction may be a direction extending along the Y axis.

It should be noted that, each bit line select structure in the embodiment of the present disclosure may correspond to four transistors or a greater number of transistors such as eight or the like. FIGS. 6A and 6B only show the case where the bit line select structure corresponds to four transistors, and the illustration in FIGS. 6A and 6B is not used to limit the number of transistors corresponding to the bit line select structure in the embodiment of the present disclosure.

It is understood that each transistor may include: a gate located on the active area and a source and a drain located in the active area on different sides of the gate.

It should be noted that in the embodiment of the present disclosure, for convenience of description, the active area and the bit line select structure are described in parallel, but in practical application, the active area may be classified into the bit line select structure actually.

Herein, multiple active areas may be arranged in an array along the first direction and the second direction, and different active areas are spaced apart by an insulating structure (e.g., a shallow trench isolation structure, STI). Each active area extends along the first direction, and each active area has a shape including a strip shape, which may be a square corner strip shape or a rounded corner strip shape. Exemplary, referring to FIG. 6A, each active area extends along the X-axis direction and each active area has a square corner strip shape.

In some embodiments, materials of the active area may include silicon (Si), germanium (Ge), silicon germanium (SiGe), and the like. In some embodiments, constituent materials of the insulating structure (not shown in FIGS. 6A and 6B) include, but are not limited to, silicon oxide ($SiO_2$).

Herein, the bit line select structure includes multiple gates corresponding to multiple transistors, the multiple gates are electrically connected as a whole by the connecting line, and each gate extends along the Y-axis direction and spans an active area. Exemplary, referring to FIGS. 6A and 6B, the first gate G1, the second gate G2, the third gate G3, the fourth gate G4, and the connecting line CG (or the connecting lines CG1, CG2), are electrically connected as a whole. An end of the first gate G1 is connected to an end of the second gate G2, and an end of the third gate G3 is connected to an end of the fourth gate G4. As shown in FIG. 6B, the connecting line CG connects two corresponding ends of the first gate G1 and the third gate G3 and two corresponding ends of the second gate G2 and the fourth gate G4. Alternatively, as shown in FIG. 6A, the connecting lines CG1, CG2 connect two corresponding ends of the first gate G1 and the third gate G3 and/or two corresponding ends of the second gate G2 and the fourth gate G4.

In some embodiments, materials of the first gate G1, the second gate G2, the third gate G3, the fourth gate G4, and the connecting line CG (or the connecting lines CG1, CG2) include but are not limited to polysilicon (Poly).

Herein, each of the multiple contact structures corresponds to a respective one of multiple gates of multiple transistors, each contact structure is located on one side, close to the connecting line, of both sides of a respective gate and connected with a respective one of the multiple active areas, and an orthographic projection of the contact structure on a plane where the active area is located is at a position in the active area close to the connecting line. It should be noted that the expression "close to" herein may be understood as meaning that, the shortest distance from a center point of the orthographic projection of the contact structure projecting on the plane where the active area is located to the connecting line is less than the shortest distance from a center point of the plane where the active area is located to the connecting line.

In some embodiments, materials of the contact structure include, but are not limited to, tungsten, cobalt, nickel, copper, aluminum, polysilicon, doped silicon, silicide, or any combination thereof.

In embodiments of the present disclosure, the multiple gates on the active areas in the semiconductor structure are electrically connected by the connecting line as a whole, which can ensure that the conduction and off characteristics of transistors in all bit line select structures are consistent. The positions of the contact structures in contact with the source/drain areas of the active areas are all disposed to be close to the connecting line, so that a resistance of the area in contact with the contact structure on the active area can be reduced. Therefore, the bit line select structure can obtain better current characteristics, thus ensuring that all bit line select structures have consistent characteristics, and at the same time have better electrical characteristics (e.g. a greater switch ratio), thereby improving the performance of the semiconductor structure.

Referring to FIGS. 6A and 6B, in some embodiments, the four mutually adjacent active areas comprise a first active area AA1, a second active area AA2, a third active area AA3 and a fourth active area AA4, the first gate G1 is located on the first active area AA1, the second gate G2 is located on the second active area AA2, the third gate G3 is located on the third active area AA3, and the fourth gate G4 is located on the fourth active area AA4.

The multiple contact structures comprise a first contact structure C1, a second contact structure C2, a third contact structure C3 and a fourth contact structure C4. The first contact structure C1 is located on one side of the first gate G1 and connected with the first active area AA1, the second contact structure C2 is located on one side of the second gate G2 and connected with the second active area AA2, the third contact structure C3 is located on one side of the third gate G3 and connected with the third active area AA3, and the fourth contact structure C4 is located on one side of the fourth gate G4 and connected with the fourth active area AA4.

Herein, the first gate G1, the second gate G2, the third gate G3, the fourth gate G4, and the connecting line CG (or the connecting lines CG1, CG2) are arranged in an "H" shape (or a rectangular), and the layout is well-proportioned and symmetrical, which facilitates manufacturing and a consistency of electrical properties.

In some embodiments, the first gate G1 and the second gate G2, and the third gate G3 and the fourth gate G4 are positioned on the same straight line along the second direction respectively, and the connecting line CG (or the connecting lines CG1, CG2) is in a straight line along the first direction. The construction of straight lines facilitates manufacturing and the consistency of electrical properties.

Referring to FIG. 6B, in some embodiments, the bit line select structure comprises a connecting line CG for connecting a connection end between the first gate G1 and the second gate G2 to a connection end between the third gate G3 and the fourth gate G4.

The first contact structure C1 and the third contact structure C3 are both located at positions on one side of the connecting line CG and close to the connecting line CG along the second direction, and the second contact structure C2 and the fourth contact structure C4 are both located at positions on the other side of the connecting line CG and close to the connecting line CG along the second direction.

Herein, the first gate G1, the second gate G2, the third gate G3, the fourth gate G4, and the connecting line CG are arranged in an "H" shape, the layout is well-proportioned and symmetrical, which facilitates manufacturing and a consistency of electrical properties.

In some embodiments, the first gate G1 and the second gate G2, and the third gate G3 and the fourth gate G4 are positioned on the same straight line along the second direction respectively, and the connecting line CG is in a straight line along the first direction. The construction of straight lines facilitates manufacturing and the consistency of electrical properties.

Herein, in conjunction with the above experimental analysis in FIGS. 5A to 5C, in FIG. 6A or 6B, the first contact structure C1 and the third contact structure C3 are both disposed close to the connection line CG, and the second contact structure C2 and the fourth contact structure C4 are both disposed close to the connection line CG, so that the transistors corresponding to the bit line select structure will have better electrical characteristics (e.g. a greater on-state current).

In some embodiments, the connection line CG (or the connecting lines CG1, CG2) constitutes a first, second, third and fourth included angle areas or rounded angle areas with the first gate G1, the second gate G2, the third gate G3, and the fourth gate G4 in the active areas respectfully, and the first contact structure C1, the second contact structure C2, the third contact structure C3 and the fourth contact structure C4 are disposed close to the included angle area or rounded angle area. That is, the projections of the first contact structure C1, the second contact structure C2, the third contact structure C3 and the fourth contact structure C4 in the active areas respectfully are at least partially located in the corresponding first, second, third and fourth included angle areas or rounded angle areas. In this way, the transistors corresponding to the bit line select structure may have a greater switching ratio.

In some embodiments, the first contact structure C1 and the third contact structure C3, and the second contact structure C2 and the fourth contact structure C4 are symmetrical with respect to the connecting line CG, respectively. In this way, the layout is well-proportioned and symmetrical, which facilitates manufacturing and a consistency of the electrical properties.

In some embodiments, the bit line select structure further comprises: a bit line select line contact CSLC and a bit line select line (not shown in FIG. 6B). An end of the bit line select line contact CSLC is connected to the connection end between the first gate G1 and the second gate G2 or the connection end between the third gate G3 and the fourth gate G4, and the other end of the bit line select line contact CSLC is connected to the bit line select line.

Herein, the bit line select line contact CSLC is disposed at the connection end between the first gate G1 and the second gate G2 or the connection end between the third gate G3 and the fourth gate G4. Thus, the bit line select line signal passing through the bit line select line CSL may be transmitted synchronously or uniformly to the first gate G1 and the second gate G2, as well as the third gate G3 and the fourth gate G4 through the bit line select line contact CSLC.

In other embodiments, the bit line select line contact CSLC is disposed at the middle of the connection line CG. Thus, the bit line select line signal passing through the bit line select line CSL may be transmitted synchronously or uniformly to each of the controlled transistors (the first gate G1, the second gate G2, the third gate G3 and the fourth gate G4) through the bit line select line contact CSLC. Herein, the bit line select line contact CSLC in FIG. 6B is moved along the X direction to the middle of the connecting line CG for understanding.

Referring to FIG. 6A, in some embodiments, the bit line select structure comprises two connecting lines. A first connecting line CG1 in the two connecting lines connects an end of the first gate G1 not connected to the second gate G2 and an end of the third gate G3 not connected to the fourth gate G4, and a second connecting line CG2 in the two connecting lines connects an end of the second gate G2 not connected to the first gate G1 and an end of the fourth gate G4 not connected to the third gate G3.

The first contact structure C1 and the third contact structure C3 are both located on one side of the first connecting line CG1 and at positions close to the first connecting line CG1 along the second direction, and the second contact structure C2 and the fourth contact structure C4 are both located on one side of the second connecting line CG2 and at positions close to the second connecting line CG2 along the second direction.

Herein, compared with the bit line select structure in FIG. 6B described above, the difference in the bit line select structure in FIG. 6A is that: the first gate G1, the second gate G2, the third gate G3, the fourth gate G4, and two connecting lines CG1, CG2 are arranged in a regular rectangle. Others details of the specific implementation may be understood with reference to the above embodiment of FIG. 6B and will not be repeated here.

In some embodiments, referring to FIG. 6A, the bit line select structure further comprises: a bit line select line contact CSLC and a bit line select line (not shown in FIG. 6A). An end of the bit line select line contact CSLC is connected to the middle of the first connection line CG1 or the middle of the second connection line CG2, and the other end of the bit line select line contact CSLC is connected to the bit line select line.

Herein, compared with the bit line select line contact CSLC in FIG. 6B described above, the difference in the bit line select line contact CSLC in FIG. 6A is that: the bit line select line contact CSLC is not disposed at the connection end between the first gate G1 and the second gate G2 or the connection end between the third gate G3 and the fourth gate G4. Others details of the specific implementation may be understood with reference to the above embodiment of FIG. 6B and will not be repeated here.

Figure 14A:
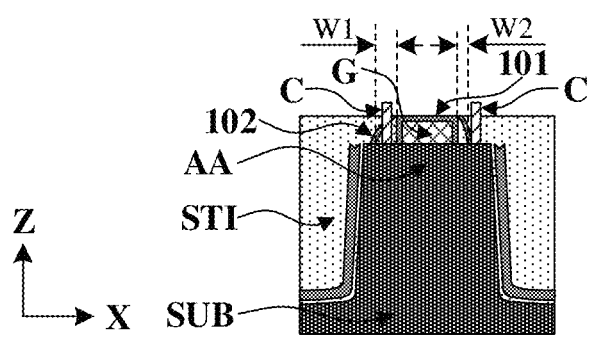
FIG. 14A is a tenth top view diagram of cross-sectional structures of a manufacturing process of a semiconductor structure provided by embodiments of the present disclosure.

Referring to FIG. 14A, in some embodiments, the bit line select structure further comprises: a spacer located on both sides of each gate. A size W1 of a portion of the spacer close to the connecting line along the first direction is greater than a size W2 of a portion of the spacer away from the connecting line along the first direction. The contact structure penetrates at least the portion of the spacer on the side close to the connecting line.

In an embodiment of the present disclosure, the contact structure penetrates at least the portion of the spacer on the side close to the connecting line. The active area partially covered by the portion of the spacer with a chamfered shape or fillet shape is exposed through the forming process of the contact structure, and a high-concentration ion implantation is carried out to reduce the resistance of the area, thereby obtaining better current characteristics and restoring the electrical characteristics of the bit line select structure. Specific details may be referred to the related descriptions in FIGS. 14A to 14B below and will not be repeated here.

Referring to the FIGS. 4A and 4B, in some embodiments, the semiconductor structure further comprises: multiple bit lines arranged along the first direction, each of the multiple bit lines being connected with a respective contact structure; and orthographic projections of the multiple bit lines on the plane where the active areas are located are separated from each other.

Multiple bit lines arranged along the first direction are spaced apart from each other to ensure an independent transmission function of the bit lines.

Referring to the FIGS. 4A and 4B, in some embodiments, each bit line comprises a body portion extending along the second direction and a protruding portion extending along the first direction, and each protruding portion is connected to a contact structure.

A protruding portion of each of the multiple bit lines connects a contact structure with a body portion of the bit line, such that the multiple bit lines arranged alone the first direction are spaced apart from each other (e.g. a bit line and a complementary bit line).

Continuing to refer to FIG. 6B, in some embodiments, the bit line select structure further comprises: a first source S1 and a first drain D1 located in each active area and separated on different sides of a corresponding gate, and each contact structure is connected to the first source S1 or the first drain D1 on a side close to the connection line.

In some embodiments, the semiconductor structure comprises multiple bit line select structures.

The multiple bit line select structures comprise a first bit line select structure 11 and a second bit select structure 12 arranged along the first direction, and two gates connected at their ends of the first bit line select structure 11 (e.g. the third gate G3 and the fourth gate G4 of the first bit line select structure 11) and two gates connected at their ends of the second bit line select structure 12 (e.g. the first gate G1 and the second gate G2 of the second bit line select structure 12) share two active areas adjacent along the second direction (such as the third active area AA3 and the fourth active area AA4 shown in FIG. 6B).

Each active area in the two shared active areas is disposed with a first source S1 and a first drain D1 corresponding to a respective one of the two gates connected at their ends of the first bit line select structure 11 and a second source S2 and a second drain D2 corresponding to a respective one of the two gates connected at their ends of the second bit line select structure. The first source/the second source or the first drain D1/the second drain D2 located between the two gates connected at their ends of the first bit line select structure and the two gates connected at their ends of the second bit line select structure is shared.

It should be noted that the positions of the first source S1 and the first drain D1 are interchangeable, and the positions of the second source S2 and the second drain D2 are interchangeable. Exemplary, as shown in FIG. 6B, the contact structures C1, C2, C3, C4 are located on the first source S1 and the second source S2, and output line contacts C5, C6 are located on the first drain D1/second drain D2. It should be noted that the embodiment of the present disclosure is also applicable to the semiconductor structure shown in FIG. 6A and the specific details can be understood with reference to FIG. 6B. Herein, the third gate G3 of the first bit line select structure 11 and the first gate G1 of the second bit line selection structure 12 are located on a common third active area AA3. The transistor corresponding to the third gate G3 of the first bit line select structure 11 and the transistor corresponding to the first gate G1 of the second bit line select structure 12 share a drain (the first drain D1/the second drain D2), and a shared output line contact C5 is formed on the shared drain. The output line contact C5 is used to connect the shared drain to the input/output line. The first gate G1 of the second bit line select structure 12 and the second gate G2 of the second bit line select structure 12 are located on a common third active area AA4. The transistor corresponding to the first gate G1 of the second bit line select structure 12 and the transistor corresponding to the second gate G2 of the second bit line select structure 12 share a drain (the first drain D1/the second drain D2), and a shared output line contact C6 is formed on the shared drain. The output line contact C6 is used to connect the shared drain to the input/output line. The output line contact C5 and the output line contact C6 are jointly connected to the same input/output line. The first source S1 of the transistor corresponding to the third gate G3 of the first bit line select structure 11, the first source S1 of the transistor corresponding to the fourth gate G4 of the first bit line select structure 11, the second source S2 of the transistor corresponding to the first gate G1 of the second bit line select structure 12, and the second source S2 of the transistor corresponding to the second gate G2 of the second bit line select structure 12 are electrically connected to respective spaced bit lines BLs through the contact structures C1, C2, C3 and C4, respectively.

In some implementations, the sizes of the output line contact C5 and the output line contact C6 along the second direction are greater than the sizes of the contact structures C1, C2, C3 and C4 along the second direction. Exemplary, the sizes of the output line contact C5 and the output line contact C6 along the second direction are twice the sizes of the contact structures C1, C2, C3 and C4 along the second direction. In the embodiment of the present disclosure, the semiconductor structure includes four transistors, i.e., the transistor corresponding to the third gate G3 of the first bit line select structure 11, the transistor corresponding to the fourth gate G4 of the first bit line select structure 11, the transistor corresponding to the first gate G1 of the second bit line select structure 12, and the transistor corresponding to the second gate G2 of the second bit line select structure 12. The transistor corresponding to the third gate G3 of the first bit line selection structure 11 and the transistor corresponding to the first gate G1 of the second bit line select structure 12 share a drain (the first drain D1/the second drain D2), the transistor corresponding to the first gate G1 of the second bit line select structure 12 and the transistor corresponding to the second gate G2 of the second bit line select structure 12 share a drain (the first drain D1/the second drain D2), and two shared drains are jointly connected to the same input/output line. Such a structure may maintain the maximum data output density of the semiconductor structure.

Figure 6C:
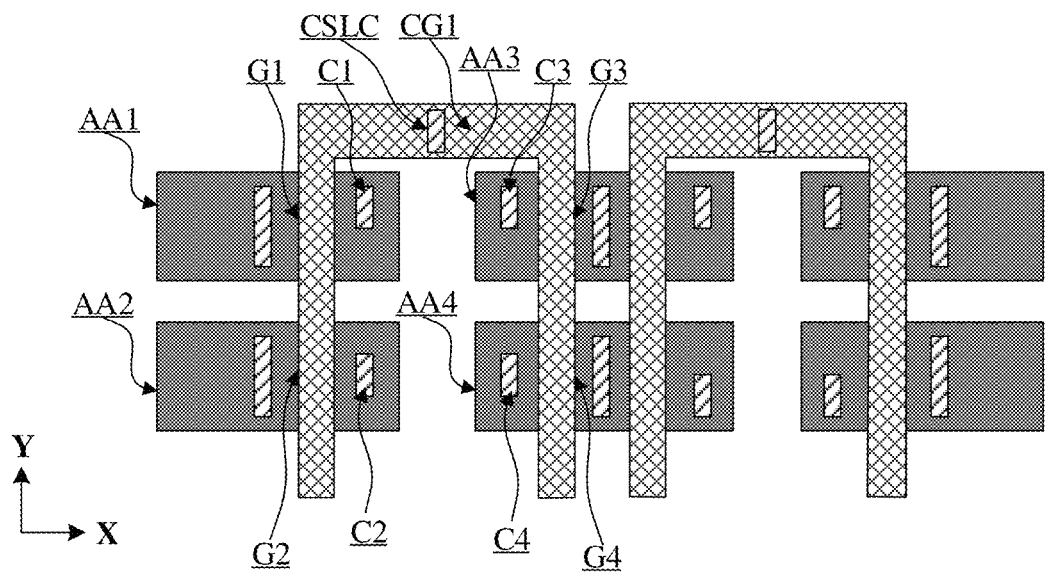
FIG. 6C is a third schematic layout of further semiconductor structures provided by embodiments of the present disclosure.

Referring to FIGS. 6C and 6D, in some embodiments, as shown in FIG. 6C, the bit line select structure includes a connecting line CG1 for connecting an unconnected end of the first gate G1 and an unconnected end of the third gate G3. The first contact structure C1 and the third contact structure C3 are both located at positions on one side of the connecting line CG1 and close to the connecting line CG1 along the second direction, and the second contact structure C2 and the fourth contact structure C4 are both located at middle positions of the corresponding active areas AA2, AA4 along the second direction. Alternatively, as shown in FIG. 6D, the bit line select structure includes a connecting line CG2 for connecting an unconnected end of the second gate G2 and an unconnected end of the fourth gate G4. The second contact structure C2 and the fourth contact structure C4 are both located at positions on one side of the connecting line CG2 and close to the connecting line CG2 along the second direction, and the first contact structure C1 and the third contact structure C3 are both located at middle positions of the corresponding active areas AA1, AA3 along the second direction.

Herein, compared with the bit line select structure in FIGS. 6A and 6B described above, the difference in the bit line select structure shown in FIGS. 6C and 6D is that: the first gate G1, the second gate G2, the third gate G3, the fourth gate G4, and the connecting line CG1 or the connecting line CG2 are arranged in an inverted "U" or a "U" shape, and the layout is well-proportioned and symmetrical, which facilitates manufacturing and a consistency of electrical properties. Others details of the specific implementation may be understood with reference to the above embodiments of FIGS. 6A and 6B and will not be repeated here.

According to a second aspect of an embodiment of the present disclosure, there is provided a memory, comprising the semiconductor structure according to any one of the above embodiments of the present disclosure.

FIG. 7 is a flowchart of a method for manufacturing a semiconductor structure provided by an embodiment of the present disclosure.

As shown in FIG. 7, there is provided a method for manufacturing a semiconductor structure according to a third aspect of an embodiment of the present disclosure, which includes the following operations.

S701, multiple active areas are formed. The multiple active areas are arranged in an array along intersecting first and second directions and are spaced apart by an isolation structure. The first direction is parallel to a direction in which the active areas extend.

S702, a bit line select structure is formed. The bit line select structure comprises: a first gate, a second gate, a third gate and a fourth gate all extending along the second direction and located on four mutually adjacent active areas in the multiple active areas respectively, and at least one connecting line extending along the first direction and located on the isolation structure. An end of the first gate is connected with an end of the second gate, an end of the third gate is connected with an end of the fourth gate, and the connecting line connects two corresponding ends of the first gate and the third gate and/or two corresponding ends of the second gate and the fourth gate.

S703, multiple contact structures are formed. Each of the multiple contact structures is located on one side, close to the connecting line, of both sides of a respective gate and connected with a respective one of the multiple active areas, and an orthographic projection of the contact structure on a plane where the active area is located is at a position, close to the connecting line, in the active area.

It should be understood that the operations shown in FIG. 7 are not exclusive and other operations may be performed before, after, or between any of the operations shown. The respective operations shown in FIG. 7 may be sequenced according to actual needs.

Herein and hereafter, the first direction and the second direction are two intersecting directions parallel to the top surface of the active area. A third direction is a direction perpendicular to the plane where the active area is located. Exemplary, the first direction is represented as the X direction in the accompanying drawings and the second direction is represented as the Y direction in the accompanying drawings, where the X direction and the Y direction are two orthogonal directions. The third direction is represented as the Z direction in the accompanying drawings.

Figure 12A:
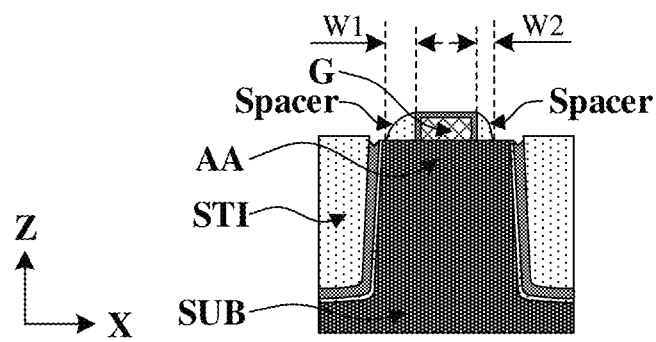
FIG. 12A is a sixth top view diagram of cross-sectional structures of a manufacturing process of a semiconductor structure provided by embodiments of the present disclosure.
Figure 12B:
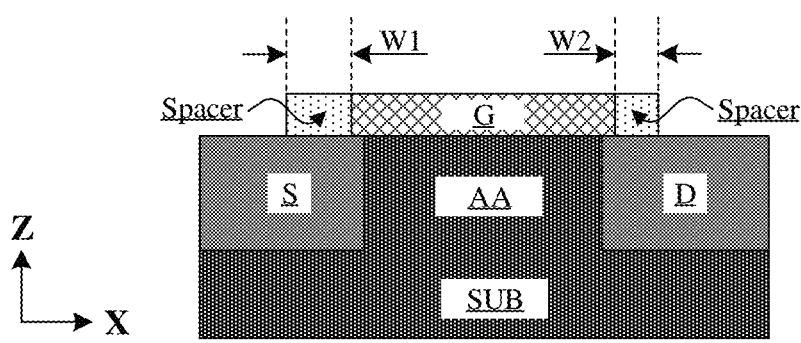
FIG. 12B is a seventh top view diagram of cross-sectional structures of a manufacturing process of a semiconductor structure provided by embodiments of the present disclosure.
Figure 12C:
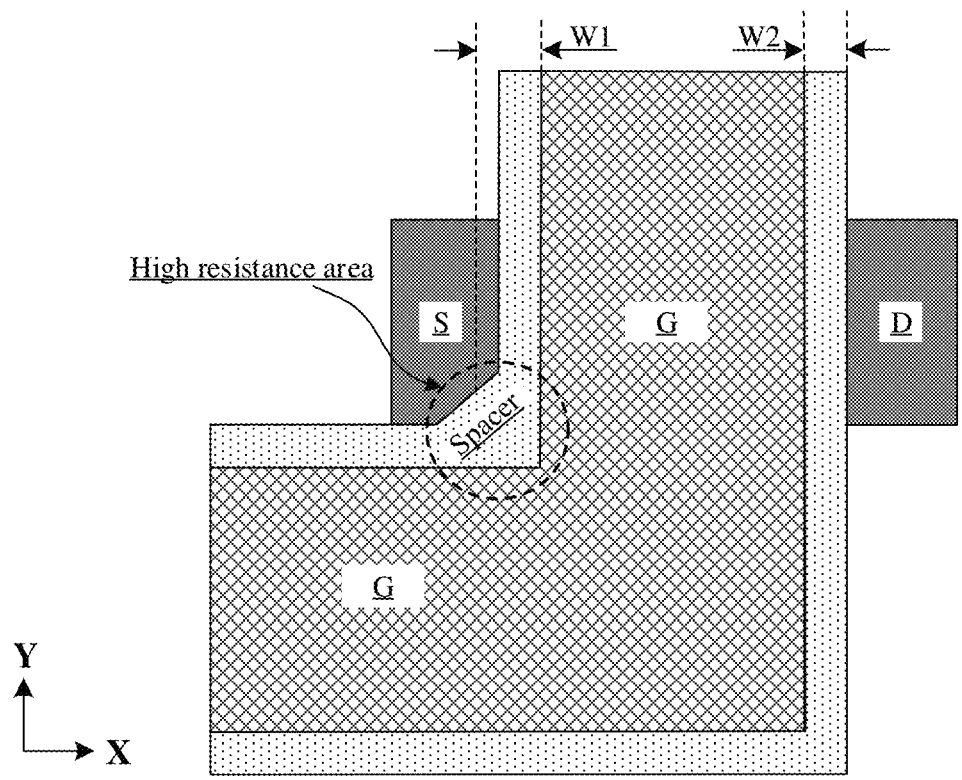
FIG. 12C is an eighth top view diagram of cross-sectional structures of a manufacturing process of a semiconductor structure provided by embodiments of the present disclosure.
Figure 13:
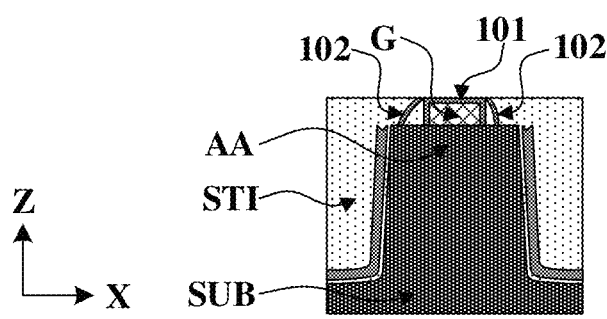
FIG. 13 is a ninth top view diagram of cross-sectional structures of a manufacturing process of a semiconductor structure provided by embodiments of the present disclosure.
Figure 14B:
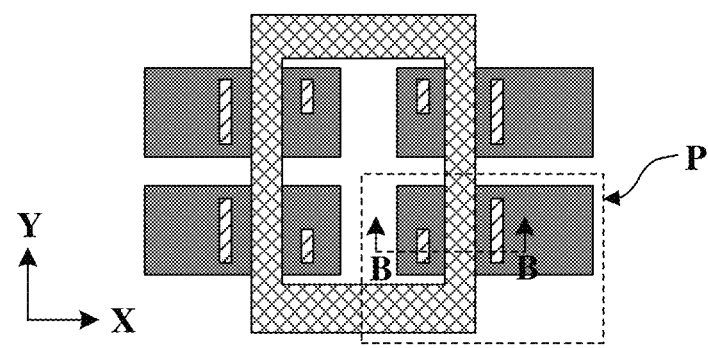
FIG. 14B is an eleventh top view diagram of cross-sectional structures of a manufacturing process of a semiconductor structure provided by embodiments of the present disclosure.

FIGS. 8-14B are top views and cross-sectional structures diagrams of a manufacturing process of a semiconductor structure provided by embodiments of the present disclosure. It should be noted that, FIG. 8, FIG. 9, FIG. 10A, FIG. 11, FIG. 12A, FIG. 13 and FIG. 14A may be understood as schematic diagrams of the structure along the B-B section in FIG. 14B in different manufacturing processes. FIG. 14B may be understood as a top view of the semiconductor structure in a manufacturing process of the semiconductor structure. FIG. 10B may be understood as an enlarged schematic diagram of the structure in the dashed box area in FIG. 10A. FIG. 12B may be understood as a schematic diagram of the structure along the B-B section in FIG. 14B. FIG. 12C may be understood as an enlarged schematic diagram of the structure in the dashed box P area in FIG. 14B. The method for manufacturing the semiconductor structure provided by an embodiment of the present disclosure will be described in detail below in conjunction with FIG. 7, and 8 to 14.

Figure 8:
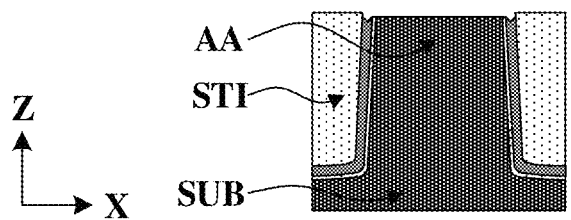
FIG. 8 is a first top view diagram of cross-sectional structures of a manufacturing process of a semiconductor structure provided by embodiments of the present disclosure.

Operation S701 is performed and multiple active areas are formed with reference to FIG. 8.

A substrate SUB is provided. Materials of the substrate SUB may include silicon, germanium, silicon germanium, etc. The materials of the substrate SUB may also be silicon on insulator or germanium on insulator.

A certain amount material with impurity ions are doped to the top of the substrate by using an ion implantation process, to form an active layer (not shown in FIG. 8). The impurity ions may be N-type impurity ions or P-type impurity ions. In an embodiment, the doping is a source-drain area doping. Exemplary, the materials of the substrate include silicon, and an N-type heavy doping is performed on the top of the substrate to form the active layer with N-type heavily doping.

A Shallow Trench Isolation (STI) process is adopted to form the multiple active areas AA arranged in an array along the first direction and the second direction, and an isolation structure STI located between adjacent active areas. Constituent materials of the isolation structure STI include but are not limited to silicon oxide.

Operation S702 is performed to form gates with reference to FIGS. 9 to 13.

Figure 9:
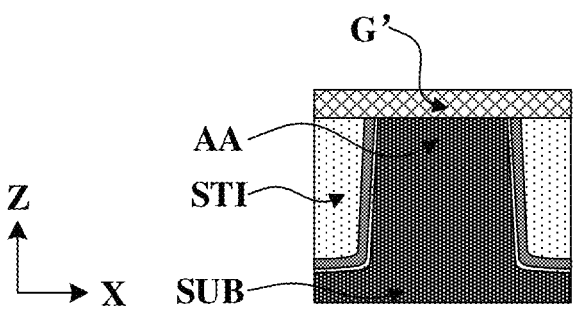
FIG. 9 is a second top view diagram of cross-sectional structures of a manufacturing process of a semiconductor structure provided by embodiments of the present disclosure.

Referring to FIG. 9, a thin film deposition process is adopted to form a gate material G' covering the active areas and the isolation structure.

Herein and hereafter, the thin film deposition process includes, but is not limited to, a Physical Vapor Deposition (PVD) process, a Chemical Vapor Deposition (CVD) process, an Atomic Layer Deposition (ALD) process, and the like.

Figure 10A:
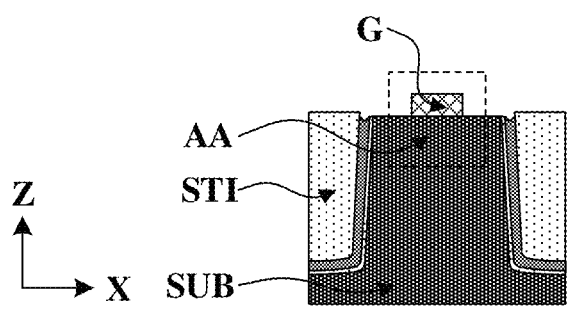
FIG. 10A is a third top view diagram of cross-sectional structures of a manufacturing process of a semiconductor structure provided by embodiments of the present disclosure.

Referring to FIG. 10A, a Lithography-Etch (LE) process is adopted to etch the gate material to form multiple gates G, and each of the multiple gates G extends along the second direction and is located on a respective one of the multiple active areas. A first gate, a second gate, a third gate and a fourth gate located on four mutually adjacent active areas in the multiple active areas respectively and at least one connecting line extending along the first direction and located on the isolation structure constitute an integral gate. A specific layout of the constituted integral gate may be referred to FIGS. 6A and 6B, and the specific details will not be described herein.

Figure 10B:
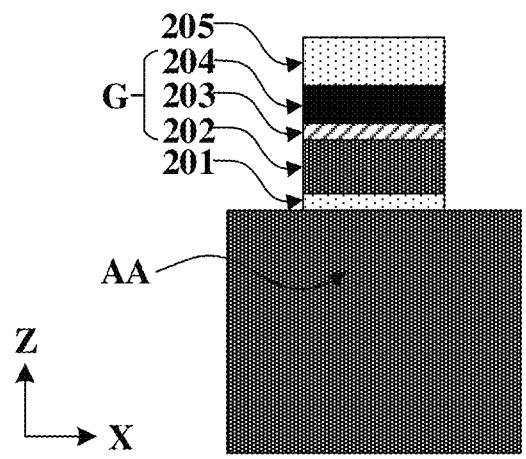
FIG. 10B is a fourth top view diagram of cross-sectional structures of a manufacturing process of a semiconductor structure provided by embodiments of the present disclosure.

It can be understood that FIG. 10B is an enlarged view of the dashed box area shown in FIG. 10A.

Referring to FIG. 10B, in some embodiments, a gate dielectric layer 201 is inserted between the gate G and the active area. Materials of the gate dielectric layer 201 include but are not limited to silicon oxide. Materials of the gate G may be metallic materials or semiconductor conductive materials, such as copper, cobalt, nickel, tungsten, molybdenum, doped silicon, polysilicon or any combination thereof, etc. In some embodiments, a protective dielectric layer 205 is also formed on the gate G. The protective dielectric layer 205 is used to protect a top surface of the gate G. Materials of the protective dielectric layer 205 include but are not limited to silicon oxide.

Continuing to refer to FIG. 10B, in some embodiments, the gate G includes a structure of multiple different conductive material layers stacked in sequence. In practical application, the gate G includes a semiconductor layer 202, an adhesive layer 203, and a metal layer 204 stacked in sequence. Exemplary, the gate G includes a polysilicon layer, a titanium carbide layer, and a metallic tungsten layer stacked in sequence.

Figure 11:
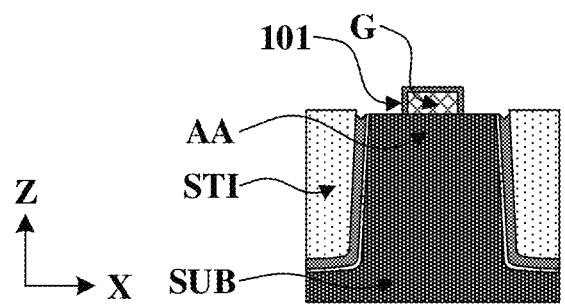
FIG. 11 is a fifth top view diagram of cross-sectional structures of a manufacturing process of a semiconductor structure provided by embodiments of the present disclosure.

Referring to FIGS. 11-13, in some embodiments, the method further includes the following operations.

A first protective layer covering each gate is formed before forming a spacer.

A second protective layer covering the spacer is formed after forming the spacer.

Referring to FIG. 11, a thin film deposition process is adopted to form a first protective layer 101 covering a top surface and sidewall of the gate. Materials of the first protective layer 101 may be selected from silicon nitride, silicon oxynitride, silicon oxide or any combination thereof. Exemplary, the materials of the first protective layer 101 include silicon nitride.

Next, the first protective layer 101 is used as a mask to perform a light doping on the active area AA to form a Lightly Doped Drain (LDD) (not shown in FIG. 11). The lightly doped drain herein includes an N-type ion implantation area.

Referring to FIG. 12A, FIG. 12A may be understood as a schematic diagram of the structure along a section B-B in FIG. 14B. The thin film deposition process is adopted to form a spacer (a sidewall spacer layer) covering a sidewall of the first protective layer 101. Materials of the spacer may be selected from silicon nitride, silicon oxynitride, silicon oxide or any combination thereof. Exemplary, the materials of the spacer include silicon oxide.

Next, the spacer and the first protective layer 101 are used as masks to perform a heavy doping on the lightly-doped active area, to form a source S and a drain D on different sides of the gate G in the active area AA. The source S and the drain D herein include N+ type ion implantation areas.

FIG. 12B may be understood as a schematic diagram of the structure along a section B-B in FIG. 14B, and FIG. 12C may be understood as an enlarged schematic diagram of the structure in the dashed box P area in FIG. 14B. For ease of display, FIGS. 11B and 12C show the active area, the gate, the source, the drain and the spacer corresponding to the bit line select line transistor, and other structures such as the bit line, the input/output line, the isolation structure between the active areas and the first protective layer are not shown.

Herein, when forming each gate and the spacer located on both sides of each gate in a patterning process, due to a diffraction effect of the optical system and an Optical Proximity Correction (OPC), each final formed gate and the spacer located on both sides of each gate is often of a chamfered or fillet shape in the included angle area or rounded angle area, not a right angle shape.

When forming each gate and the spacer located on both sides of each gate in the patterning process, a portion of the spacer with a chamfered shape or fillet shape has a greater planar size than other portions of the spacer. In particular, a size W1 of a portion of the spacer close to the connecting line along the first direction is greater than a size W2 of a portion of the spacer away from the connecting line along the first direction. Therefore, a portion of the active area covered by the portion of the spacer with a chamfered shape or fillet shape has a high resistance area, which will affect the electrical characteristics of the bit line select structure.

As such, the active area covered by the portion of the spacer with a chamfered shape or fillet shape is obscured and cannot be completely implanted during the subsequent ion implantation of the source and drain, such that the portion of the active area covered by the portion of the spacer with a chamfered shape or fillet shape has a high resistance area, which will affect the electrical characteristics of the bit line select structure and needs to be improved in the subsequent process (referring to the description related to forming multiple contact structures in FIGS. 14A and 14B below).

Referring to FIG. 13, a thin film deposition process is adopted to form a second protective layer 102 covering the sidewall of the spacer. Materials of the second protective layer 102 may be selected from silicon nitride, silicon oxynitride, silicon oxide or any combination thereof. Exemplary, the materials of the second protective layer 102 include silicon nitride.

Further, a filling dielectric layer is formed in a gap between the second protective layers 102. Materials of the filling dielectric layer include silicon oxide.

Operation S703 is performed to form multiple contact structures with reference to FIGS. 14A to 14B.

It should be noted that FIG. 14B is a top view of the semiconductor structure in a manufacturing process of the semiconductor structure. FIG. 14B shows the active area, the gate, the connecting line, and the contact structure corresponding to the bit line select line transistor, and other structures such as the bit line, the input/output line, and the isolation structure between the active areas are not shown.

Referring to FIGS. 14A-14B, in some embodiments, the method further includes the following operation.

A spacer is formed on both sides of each gate respectively. A size W1 of a portion of the spacer close to the connecting line along the first direction is greater than a size W2 of a portion of the spacer away from the connecting line along the first direction.

The operation of forming the multiple contact structures comprises the following actions.

A contact hole penetrating at least the portion of the spacer on the side close to the connecting line is formed.

Ion implantation is performed on a portion of the active area exposed by the contact hole.

The contact hole is filled with a conducting material to obtain the contact structure.

Herein, referring to FIGS. 6A and 6B, the connection line CG (or the connecting lines CG1, CG2) constitutes a first, second, third and fourth included angle areas or rounded angle areas in the active area with the first gate G1, the second gate G2, the third gate G3, and the fourth gate G4 respectfully.

Referring to FIGS. 12B and 12C, the size W1 of the portion of the spacer close to the connecting line along the first direction is greater than the size W2 of the portion of the spacer away from the connecting line along the first direction. Therefore, the portion of the active area covered by the portion of the spacer with a chamfered shape or fillet shape has a high resistance area, which will affect the electrical characteristics of the bit line select structure.

In the embodiment of the present disclosure, a contact hole penetrating at least the portion of the spacer on the side close to the connecting line is formed; ion implantation is carried out on the portion of the active area exposed by the contact hole; and the contact hole is filled with a conducting material to obtain the contact structure. The contact structure penetrates at least the portion of the spacer on the side close to the connecting line. The active area partially covered by the portion of the spacer with a chamfered shape or fillet shape is exposed through the forming process of the contact structure, and a high-concentration ion implantation is carried out to reduce the resistance of the area, thereby obtaining better current characteristics and improving the electrical characteristics of the bit line select structure.

The semiconductor structure obtained by the method for manufacturing the semiconductor structure provided by the embodiment of the present disclosure is similar to the semiconductor structure in the above-mentioned embodiment. For technical features not disclosed in detail in the embodiment of the present disclosure, reference is made to the above-mentioned embodiment for understanding, and will not be described herein.

It should be understood that references to "an embodiment" or "one embodiment" throughout the specification mean that particular features, structures, or characteristics related to the embodiment are included in at least one embodiment of the present disclosure. Thus, the words "in an embodiment" or "in one embodiment" appearing throughout the specification do not necessarily refer to the same embodiment. Further, these particular features, structures or characteristics may be incorporated in one or more embodiments in any suitable manner. It should be understood that in various embodiments of the present disclosure, the sequence number of the above-described process does not mean the order of execution, and the execution order of each process should be determined by its function and inherent logic, and should not constitute any limitation on the implementation process of the embodiments of the present disclosure. The above sequence numbers of the embodiments of the present disclosure are for description only and do not represent the advantages and disadvantages of the embodiments.

The methods disclosed in several method embodiments provided in the present disclosure can be arbitrarily combined without conflict to obtain new method embodiments.

The above are only specific implementations of the present disclosure, and the scope of protection of the present disclosure is not limited thereto. Any change or replacement readily conceivable by a person skilled in the art within the technical scope disclosed by the present disclosure should fall within the scope of protection of the present disclosure. Therefore, the scope of protection of the present disclosure shall be subject to the scope of protection of the claims.

In embodiments of the present disclosure, the multiple gates on the active areas in the semiconductor structure are electrically connected as a whole by the connecting line, which can ensure consistent conduction and off characteristics of all transistors in the bit line select structure. The positions of the contact structures in contact with the source/drain areas of the active areas are all disposed close to the connecting line, so that the resistance of the area in contact with the contact structure on the active area can be reduced. In this way, the semiconductor structure can obtain better current characteristics, thus ensuring that all bit line select structures have consistent characteristics and better electrical characteristics, thereby improving the performance of the semiconductor structure.

What is claimed is:

1. A semiconductor structure, comprising:
    a plurality of active areas arranged in an array along intersecting first and second directions and spaced apart by an isolation structure, the first direction being parallel to a direction in which the plurality of active areas extend;
    a bit line select structure comprising a first gate, a second gate, a third gate and a fourth gate all extending along the second direction and located on four mutually adjacent active areas in the plurality of active areas respectively, and at least one connecting line extending along the first direction and located on the isolation structure, an end of the first gate being connected with an end of the second gate, an end of the third gate being connected with an end of the fourth gate, and the connecting line connecting two corresponding ends of the first gate and the third gate and/or two corresponding ends of the second gate and the fourth gate; and
    a plurality of contact structures, each of the plurality of contact structures being located on one side, close to the connecting line, of both sides of a respective gate and connected with a respective one of the plurality of active areas, and an orthographic projection of the contact structure on a plane where the active area is located being at a position, close to the connecting line, in the active area.

2. The semiconductor structure of claim 1, wherein
    the four mutually adjacent active areas comprise a first active area, a second active area, a third active area and a fourth active area, the first gate is located on the first active area, the second gate is located on the second active area, the third gate is located on the third active area, and the fourth gate is located on the fourth active area; and
    the plurality of contact structures comprise a first contact structure, a second contact structure, a third contact structure and a fourth contact structure, the first contact structure is located on one side of the first gate and connected with the first active area, the second contact structure is located on one side of the second gate and connected with the second active area, the third contact structure is located on one side of the third gate and connected with the third active area, and the fourth contact structure is located on one side of the fourth gate and connected with the fourth active area.

3. The semiconductor structure of claim 2, wherein
    the bit line select structure comprises one connecting line for connecting a connection end between the first gate and the second gate to a connection end between the third gate and the fourth gate; and
    the first contact structure and the third contact structure are both located at positions on one side of the connecting line and close to the connecting line along the second direction, and the second contact structure and the fourth contact structure are both located at positions on the other side of the connecting line and close to the connecting line along the second direction.

4. The semiconductor structure of claim 3, wherein the bit line select structure further comprises:
    a bit line select line contact structure and a bit line select line, an end of the bit line select line contact structure is connected to the connection end between the first gate and the second gate or the connection end between the third gate and the fourth gate, and the other end of the bit line select line contact structure is connected to the bit line select line.

5. The semiconductor structure of claim 2, wherein
    the bit line select structure comprises two connecting lines, a first connecting line in the two connecting lines connects an end of the first gate not connected to the second gate with an end of the third gate not connected to the fourth gate, and a second connecting line in the two connecting lines connects an end of the second gate not connected to the first gate with an end of the fourth gate not connected to the third gate; and
    the first contact structure and the third contact structure are both located at positions on one side of the first connection line and close to the first connection line along the second direction, and the second contact structure and the fourth contact structure are both located at positions on one side of the second connection line and close to the second connection line along the second direction.

6. The semiconductor structure of claim 5, wherein the bit line select structure further comprises:
    a bit line select line contact structure and a bit line select line, an end of the bit line select line contact structure is connected to a middle of the first connection line or a middle of the second connection line, and the other end of the bit line select line contact structure is connected to the bit line select line.

7. The semiconductor structure of claim 1, wherein the bit line select structure further comprises:
    a spacer located on both sides of each gate, a size of a portion of the spacer close to the connecting line along the first direction is greater than a size of a portion of the spacer away from the connecting line along the first direction, and the contact structure penetrates at least the portion of the spacer on the side close to the connecting line.

8. The semiconductor structure of claim 1, further comprising:
a plurality of bit lines arranged along the first direction, each of the plurality of bit lines being connected with a respective one of the plurality of contact structures, and orthographic projections of the plurality of bit lines on the plane where the active area is located are separated from each other.

9. The semiconductor structure of claim 8, wherein each of the plurality of bit lines comprises a body portion extending along the second direction and a protruding portion extending along the first direction, the protruding portion being connected to the contact structure.

10. The semiconductor structure of claim 1, wherein the bit line select structure further comprises:
a first source and a first drain located in each active area and separated on different sides of the respective gate, and the contact structure is connected to the first source or the first drain on a side close to the connection line.

11. The semiconductor structure of claim 10, further comprising:
a plurality of bit line select structures, the plurality of bit line select structures comprising a first bit line select structure and a second bit select structure arranged along the first direction, and two gates connected at their ends of the first bit line select structure and two gates connected at their ends of the second bit line select structure share two active areas adjacent along the second direction; and
each of the two shared active areas is disposed with a first source and a first drain corresponding to a respective one of the two gates connected at their ends of the first bit line select structure and a second source and a second drain corresponding to a respective one of the two gates connected at their ends of the second bit line select structure, and the first source/the second source or the first drain/the second drain located between the two gates connected at their ends of the first bit line select structure and the two gates connected at their ends of the second bit line select structure is shared.

12. The semiconductor structure of claim 1, wherein the first direction is perpendicular to the second direction.

13. A memory, comprising a semiconductor structure, the semiconductor structure comprising:
a plurality of active areas arranged in an array along intersecting first and second directions and spaced apart by an isolation structure, the first direction being parallel to a direction in which the plurality of active areas extend;
a bit line select structure comprising a first gate, a second gate, a third gate and a fourth gate all extending along the second direction and located on four mutually adjacent active areas in the plurality of active areas respectively, and at least one connecting line extending along the first direction and located on the isolation structure, an end of the first gate being connected with an end of the second gate, an end of the third gate being connected with an end of the fourth gate, and the connecting line connecting two corresponding ends of the first gate and the third gate and/or two corresponding ends of the second gate and the fourth gate; and
a plurality of contact structures, each of the plurality of contact structures being located on one side, close to the connecting line, of both sides of a respective gate and connected with a respective one of the plurality of active areas, and an orthographic projection of the contact structure on a plane where the active area is located being at a position, close to the connecting line, in the active area.

14. The memory of claim 13, wherein
the four mutually adjacent active areas comprise a first active area, a second active area, a third active area and a fourth active area, the first gate is located on the first active area, the second gate is located on the second active area, the third gate is located on the third active area, and the fourth gate is located on the fourth active area; and
the plurality of contact structures comprise a first contact structure, a second contact structure, a third contact structure and a fourth contact structure, the first contact structure is located on one side of the first gate and connected with the first active area, the second contact structure is located on one side of the second gate and connected with the second active area, the third contact structure is located on one side of the third gate and connected with the third active area, and the fourth contact structure is located on one side of the fourth gate and connected with the fourth active area.

15. The memory of claim 14, wherein
the bit line select structure comprises one connecting line for connecting a connection end between the first gate and the second gate to a connection end between the third gate and the fourth gate; and
the first contact structure and the third contact structure are both located at positions on one side of the connecting line and close to the connecting line along the second direction, and the second contact structure and the fourth contact structure are both located at positions on the other side of the connecting line and close to the connecting line along the second direction.

16. The memory of claim 14, wherein
the bit line select structure comprises two connecting lines, a first connecting line in the two connecting lines connects an end of the first gate not connected to the second gate with an end of the third gate not connected to the fourth gate, and a second connecting line in the two connecting lines connects an end of the second gate not connected to the first gate with an end of the fourth gate not connected to the third gate; and
the first contact structure and the third contact structure are both located at positions on one side of the first connection line and close to the first connection line along the second direction, and the second contact structure and the fourth contact structure are both located at positions on one side of the second connection line and close to the second connection line along the second direction.

17. The memory of claim 13, wherein the bit line select structure further comprises:
a spacer located on both sides of each gate, a size of a portion of the spacer close to the connecting line along the first direction is greater than a size of a portion of the spacer away from the connecting line along the first direction, and the contact structure penetrates at least the portion of the spacer on the side close to the connecting line.

18. A method for manufacturing a semiconductor structure, comprising:
forming a plurality of active areas arranged in an array along intersecting first and second directions and spaced apart by an isolation structure, the first direction being parallel to a direction in which the plurality of active areas extend;

forming a bit line select structure comprising a first gate, a second gate, a third gate and a fourth gate all extending along the second direction and located on four mutually adjacent active areas in the plurality of active areas respectively, and at least one connecting line extending along the first direction and located on the isolation structure, an end of the first gate being connected with an end of the second gate, an end of the third gate being connected with an end of the fourth gate, and the connecting line connecting two corresponding ends of the first gate and the third gate and/or two corresponding ends of the second gate and the fourth gate; and forming a plurality of contact structures, each of the plurality of contact structures being located on one side, close to the connecting line, of both sides of a respective gate and connected with a respective one of the plurality of active areas, and an orthographic projection of the contact structure on a plane where the active area is located being at a position, close to the connecting line, in the active area.

19. The method of claim 18, further comprising:

forming a spacer on both sides of each gate respectively, a size of a portion of the spacer close to the connecting line along the first direction being greater than a size of a portion of the spacer away from the connecting line along the first direction; and forming the plurality of contact structures comprises:

forming a contact hole penetrating at least the portion of the spacer on the side close to the connecting line;

performing ion implantation on a portion of the active area exposed by the contact hole; and filling the contact hole with a conducting material to obtain the contact structure.

20. The method of claim 19, further comprising:

forming a first protective layer covering each gate before forming the spacer; and forming a second protective layer covering the spacer after forming the spacer.

* * * * *